United States Patent [19]
Meyer

[11] Patent Number: 5,591,944
[45] Date of Patent: Jan. 7, 1997

[54] OVERLOAD STOP ASSEMBLY FOR A LOAD CELL

[75] Inventor: Richard A. Meyer, Carver, Minn.

[73] Assignee: MTS Systems Corporation, Eden Prairie, Minn.

[21] Appl. No.: 177,613

[22] Filed: Jan. 5, 1994

[51] Int. Cl.⁶ .......................... G01G 3/08; G01G 23/02
[52] U.S. Cl. .................. 177/229; 177/154; 73/862.382; 73/862.632
[58] Field of Search .................................. 177/154, 184, 177/189, 229, 187, 188; 73/862.382, 862.632, 862.633, 862.634, 862.635, 862.638

[56] References Cited

U.S. PATENT DOCUMENTS

| | | | |
|---|---|---|---|
| 3,135,112 | 6/1964 | Farley | 73/862.632 |
| 3,319,338 | 5/1967 | De Nicola | 33/148 |
| 3,789,508 | 2/1974 | Meline | 33/148 |
| 4,170,270 | 10/1979 | Sette et al. | 177/184 |
| 4,223,443 | 9/1980 | Bachman et al. | 33/148 |
| 4,419,902 | 12/1983 | Somal | 73/862.65 |
| 4,467,661 | 8/1984 | Somal | 73/862.62 |
| 4,485,881 | 12/1984 | Tramposch et al. | 177/211 |

*Primary Examiner*—Brian W. Brown
*Assistant Examiner*—Randy W. Gibson
*Attorney, Agent, or Firm*—Westman, Champlin & Kelly, P.A.

[57] ABSTRACT

A load cell assembly for measuring force loads between two elements includes a four-bar linkage with connection arms mounted at opposite corners. Each of the connection arms include a first end rigidly connected to the four-bar linkage and a free end. An overload stop assembly rigidly connected to the four-bar linkage selectively limits displacement of at least one of the free ends when excessive force loads are present.

13 Claims, 5 Drawing Sheets

OVERLOAD STOP ASSEMBLY FOR A LOAD CELL

BACKGROUND OF THE INVENTION

The present invention relates to a load cell used to measure force loads. More particularly, the present invention provides a load cell having an overload stop assembly that protects the load cell when excessive force loads are present.

Small capacity force transducers or load cells are commonly used to measure light forces loads. Unfortunately, the load cell is also routinely subjected to excessive force loads that can easily damage the structural integrity of the load cell or the force sensing elements used therein. The force overloads can be axial, torsional, bending or side forces. These overload situations can arise from rough handling, during affixation of grips, specimen loading or during shipping.

SUMMARY OF THE INVENTION

A load cell is disclosed that measures force loads along a test axis defined by connection points on a flexure assembly. The flexure assembly includes strain measuring elements that provide a representative output signal to a monitor, the force output signal being proportional to the force applied between the connection points. An overload stop assembly rigidly connects the connection points together to protect the flexure assembly from excessive force loads. Essentially, when excessive forces are applied to the load cell, the load cell can be modeled as two parallel springs. The first spring corresponds to the flexure assembly and is relatively soft, while the second spring corresponds to the overload stop assembly, which is stiff compared to the flexure assembly. Thus, although some force is transmitted through the flexure assembly in the presence of excessive forces, the overload stop assembly being stiffer transmits most of the excessive forces.

The load cell includes a four-bar linkage comprising two rigid support portions. Each of the support portions have a first end and a second end. The support portions are substantially parallel to each other. A first flexure bar assembly joins the first ends of the support portions together, while a second flexure bar assembly joins the second ends of the support portions together. Each of the flexure bar assemblies includes two spaced apart flexure regions of reduced thickness with a rigid support portion formed therebetween. Suitable strain sensing elements are conventionally applied to measure deformation of the flexure regions and provide a proportional output signal.

Connection arms mounted at opposite corners of the four-bar linkage are used to connect the load cell between the elements to be tested. Each of the connection arms includes a first end rigidly connected to one of the support portions and a second free end located between the flexure regions of each of the respective flexure bar assemblies.

In a first embodiment, the overload stop assembly includes a stop bar having a first end connected to one of the support portions and a free end positioned adjacent one of the free ends of one of the connection arms. A projection extends from the free end of the connection arm and is located in an aperture in the free end of the stop bar. When excessive tension or compression loads displace the free end of the connection arm, the projection contacts the inner walls of the aperture thereby rigidly connecting the connection arm to the stop bar and limiting any further displacement. The excessive forces are then transmitted through the stop bar, the support portion and the other connection arm substantially bypassing the flexure assembly. Optional guard plates connected to the free end of the stop bar limit displacement of the free end of the connection arm in a plane perpendicular to the test axis.

In other embodiments, the stop assembly includes two interlocking stop portions. A first stop portion is joined to the free end of the first connection arm and extends toward the second connection arm, while a second stop portion is joined to the free end of the second connection arm and extends toward the first connection arm. In a second embodiment, the stop portions extend through apertures in the rigid portions of the flexure bar assemblies, the stop portions being positioned on the test axis. In a third embodiment, the stop portions extend along a side of the flexure assembly parallel to the test axis.

The present invention provides a very sensitive force sensing structure with overload capacity in either tension or compression of at least 20 times the rated capacity of the load cell. The load cell includes an overload stop assembly that is pre-machined, does not require adjustment, and does not affect the performance of the load cell up to the rated capacity of the load cell. The stop assembly does not use moving parts or extra preloaded spring sets which can add complexity, provide sources of hysteresis, or contribute to dynamic problems for fully reversed tension compression fatigue loading. In addition, the stop assembly does not add sprung mass to the load cell which would lower the natural frequency of the load cell.

DETAILED DESCRIPTION OF THE PREFERRED EMBODIMENTS

Figure 1:
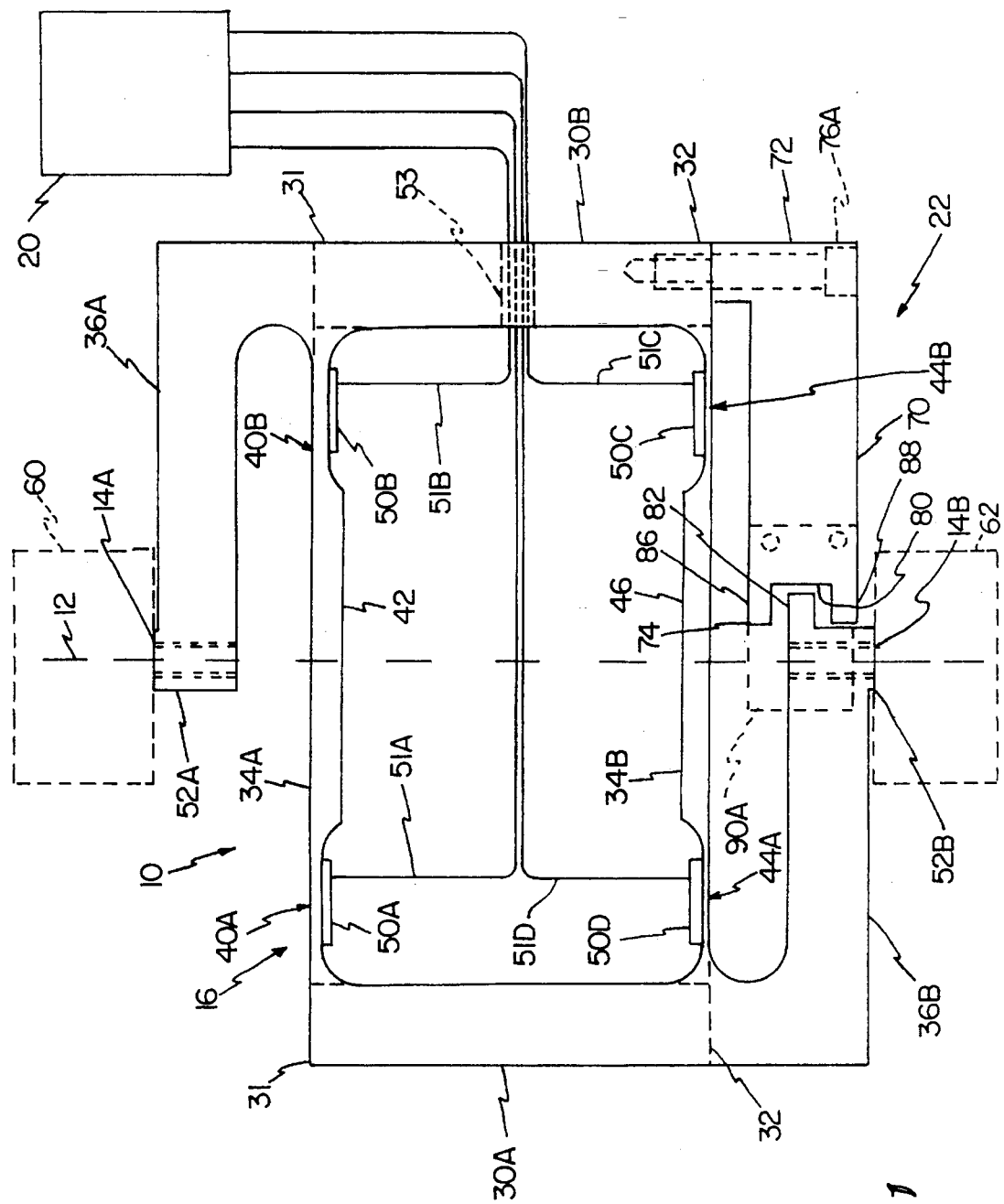
FIG. 1 is a front elevational view of a first embodiment of the present invention.

A first embodiment of the load cell of the present invention is illustrated generally at 10 in FIG. 1. Load cell 10 measures tension and compressive loads along a test axis 12 defined by connection points 14A and 14B through a flexure assembly 16. The flexure assembly 16 includes strain measuring elements described below that provide a representative output signal to a monitor 20, the force output signal being proportional to the force applied between connection points 14A and 14B. An overload stop assembly 22 rigidly connects the connection points 14A and 14B together to protect the flexure assembly 16 from excessive force loads.

Figure 8:
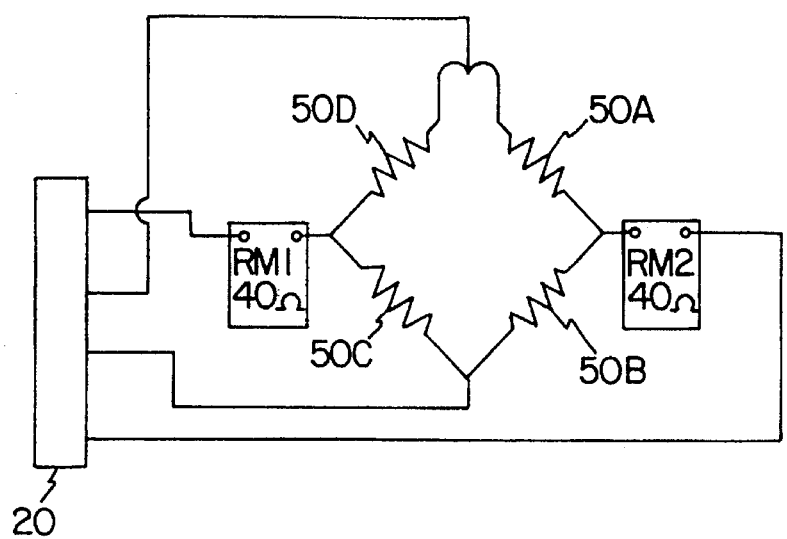
FIG. 8 is a circuit diagram for strain measuring elements.

The load cell 10 includes a four-bar linkage comprising two rigid support portions 30A and 30B. The support portions 30A and 30B each include a first end 31 and a second end 32. The support portions 30A and 30B are substantially parallel to each other. A flexure bar assembly 34A joins the ends 31 of the support portions 30A and 30B together, while a second flexure bar assembly 34B joins the ends 32 of the support portions 30A and 30B together. The flexure bar assembly 34A includes two spaced apart flexure regions of reduced thickness 40A and 40B with a rigid support portion 42 formed therebetween. The flexure bar assembly 34B is similarly constructed having two spaced flexure regions of reduced thickness 44A and 44B with a rigid support portion 46 formed therebetween. Suitable strain sensing elements 50A, 50B, 50C, and 50D are conventionally applied to measure deformation of the flexure regions 40A, 40B, 44A and 44B. The strain sensing elements 50A–50D are connected to the monitor 20 with signal lines 51A, 51B, 51C and 51D. The signal lines 51A–51D extend through an aperture 53 in the second support portion 30B. The stain sensing elements 50A–50D are connected in a conventional Wheatstone bridge illustrated FIG. 8.

Connection arms 36A and 36B are joined at opposite corners of the flexure assembly 16 and include the connection points 14A and 14B, embodied herein as threaded apertures. The connection arm 36A is joined to the first end 31 of the second support portion 30B, while the connection arm 36B is joined to the second end 32 of the first support portion 30A. Each of the connection arms 36A and 36B project inwardly over the flexure assembly 16, having free ends 52A and 52B, respectively. The free ends 52A and 52B are used to mount the load cell 10 between elements 60 and 62 using the connection points 14A and 14B to measure the tension and compressive loads applied therebetween. Preferably, the lengths of the connection arms 36A and 36B are equal and sufficient to locate the test axis 12 through the zero moment axis of the rigid support portions 42 and 46.

Figure 2:
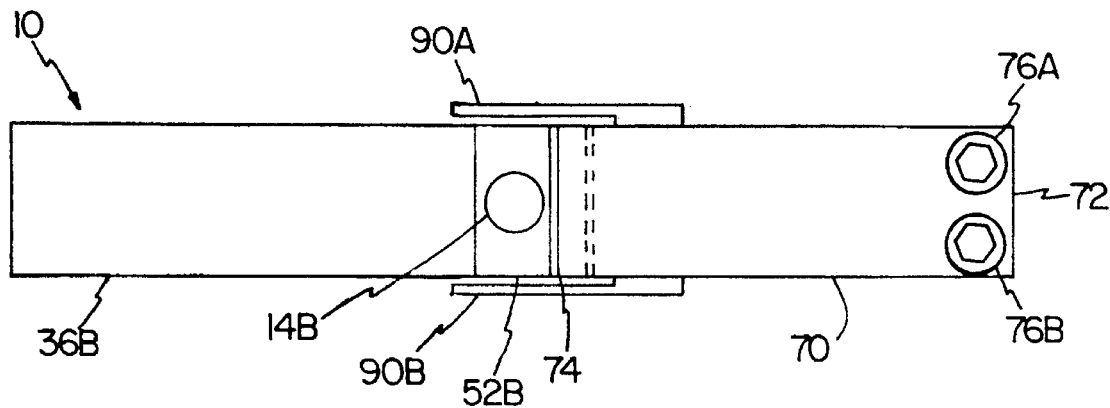
FIG. 2 is a bottom plan view of the embodiment of FIG. 1.

As stated above the load cell 10 includes the overload stop assembly 22 that rigidly connects the connection arm 36A to the connection arm 36B when excessive force loads are present. Referring also to FIG. 2, the overload stop assembly 22 includes a stop arm 70 having a first end 72 and the second end 74. Mounting bolts 76A and 76B join the first end 72 to the second end 32 of the second support portion 30B. The second end 74 is a free end positioned adjacent to the free end 52B of the connection arm 36B. The second end 74 selectively contacts the free end 52B of the connection arm 36B to limit displacement thereof and rigidly connect the connection arm 36B to the second support portion 30B. The overload stop assembly 22 includes an extending flange 82 formed on the free end of the connection arm 36B, a portion of which is located in an aperture 80 formed in the end 74 of the stop arm 70. Specifically, the aperture 80 is a slot formed from a perimeter edge of the second end 74 inwardly to form two opposed flanges 86 and 88. The flange 82 is located within the slot 80 between the flanges 86 and 88, the flanges 86 and 88 operate as overtravel stops limiting upward and downward displacement of the free end 52B of the connection arm 36B so that when excessive force is applied either in compression or tension, displacement of the free end 52B of the connection arm 36B is limited upon contact of the flange 82 with one of the flanges 86 or 88. The excessive force is thus transmitted directly through the bar 70, the support portion 30B and the connection arm 30A thereby bypassing the flexure assembly 16 having the thin flexure regions 40A, 40B, 44A, and 44B. Since the connection regions between connection arm 36A and the first end 31 of the second support portion 30B and the connection region of the stop bar 70 with the second end 32 of the second support portion 30B are substantially rigid, the excessive force is transmitted through the load cell 10 without damage to the flexure assembly 16.

Referring back to FIG. 2, guard plates 90A and 90B joined on opposite sides to the stop bar 70 limit displacement of the free end 52B of the second connection arm 36B in a plane perpendicular to the test axis 12. Each of the guard plates 90A and 90B have a first end rigidly connected to the stop bar 70 and a second free end positioned adjacent but spaced apart from the free end 52B of the connection arm 36B. The guard plates 90A and 90B protect the flexure assembly 16 from torsional loading and side forces.

Preferably, the support portions 30A and 30B and the flexure bar assemblies 34A and 34B are integral being formed from a single unitary piece using known EDM machining techniques. If desired, the stop bar 70 and guard plates 90A and 90B can also be integrally connected to the second support portion 30B using this same machining technique.

Figure 3:
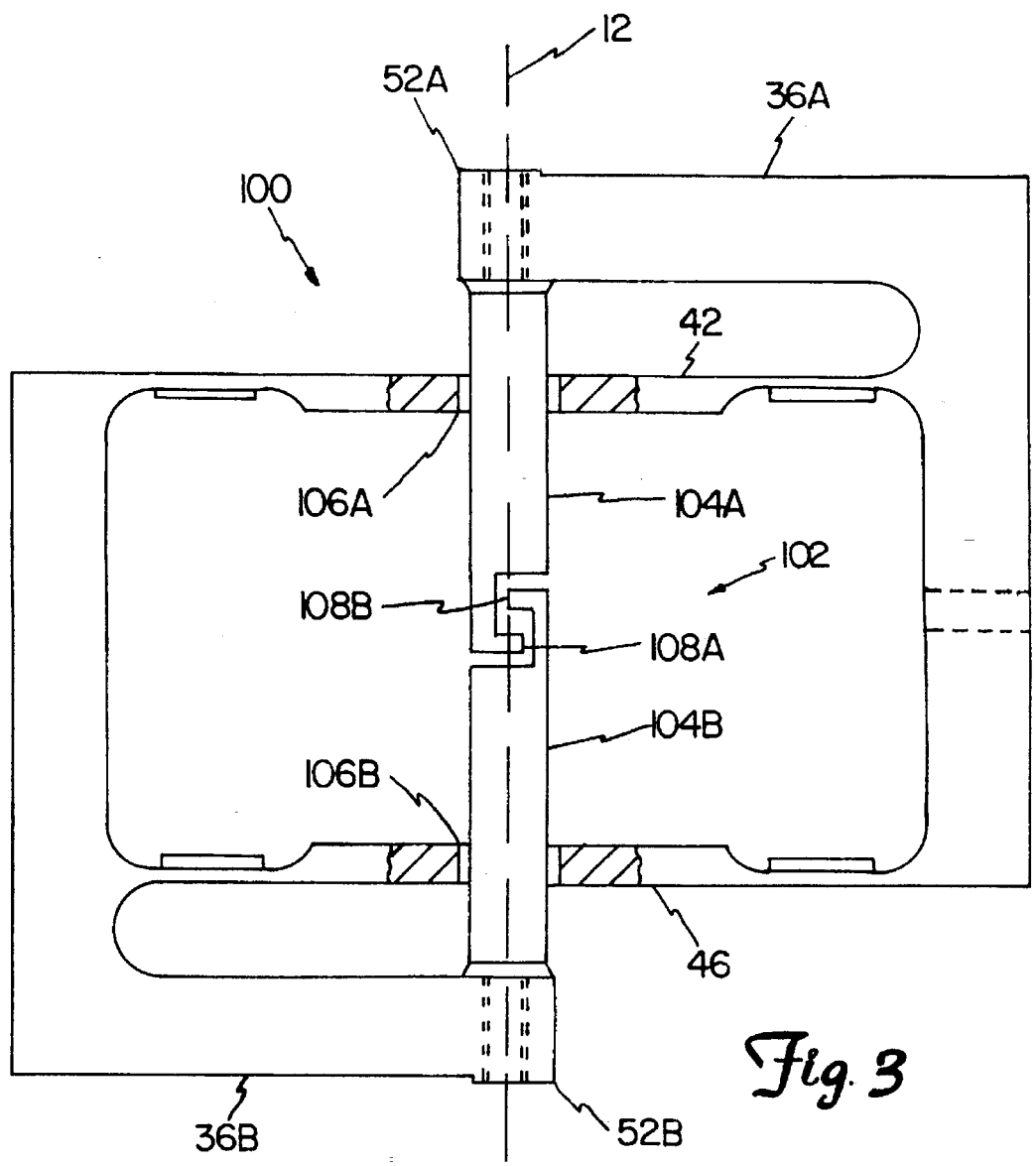
FIG. 3 is a front elevational view of a second embodiment of the present invention with parts in section.
Figure 4:
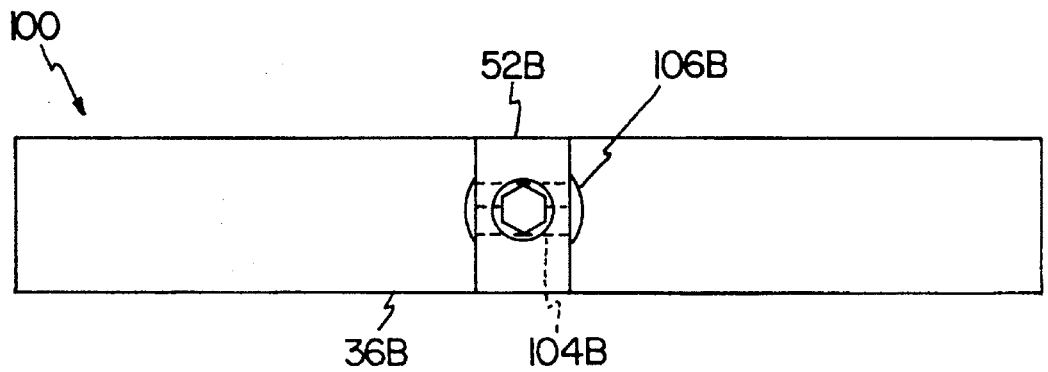
FIG. 4 is a bottom plan view of the embodiment of FIG. 3.

A second embodiment of the load cell of the present invention is illustrated generally at 100 in FIGS. 3 and 4. The second load cell 100 includes an overload stop assembly 102 positioned on the test axis 12. The overload stop assembly 102 includes a stop bar 104A rigidly connected to the free end 52A of the first connection arm 36A, and a second stop bar 104B rigidly connected to the free end 52B of the second connection arm 36B. Each of the stop bars 104A and 104B project through corresponding apertures 106A and 106B formed in rigid portions 42 and 46, respectively. Each of the stop bars 104A and 104B include projecting flanges 108A and 108B, respectively, that contact each other when the free ends 52A and 52B are displaced away from each other in the presence of excessive tension loads. In similar fashion, the projecting flange 108A contacts the support bar 104B and the projecting flange 108B contacts the support bar 104A when the free ends 52A and 52B are displaced toward each other in the presence of excessive compressive loads. The overload assembly 102 thus limits displacement of the free ends 52A and 52B by rigidly connecting the free ends 52A and 52B when excessive force loads exist. Lateral displacement in a plane perpendicular to the test axis 12 of each of the free ends 52A and 52B is limited upon contact of the stop bars 104A and 104B with the inner walls of the apertures 106A and 106B, respectively.

Figure 5:
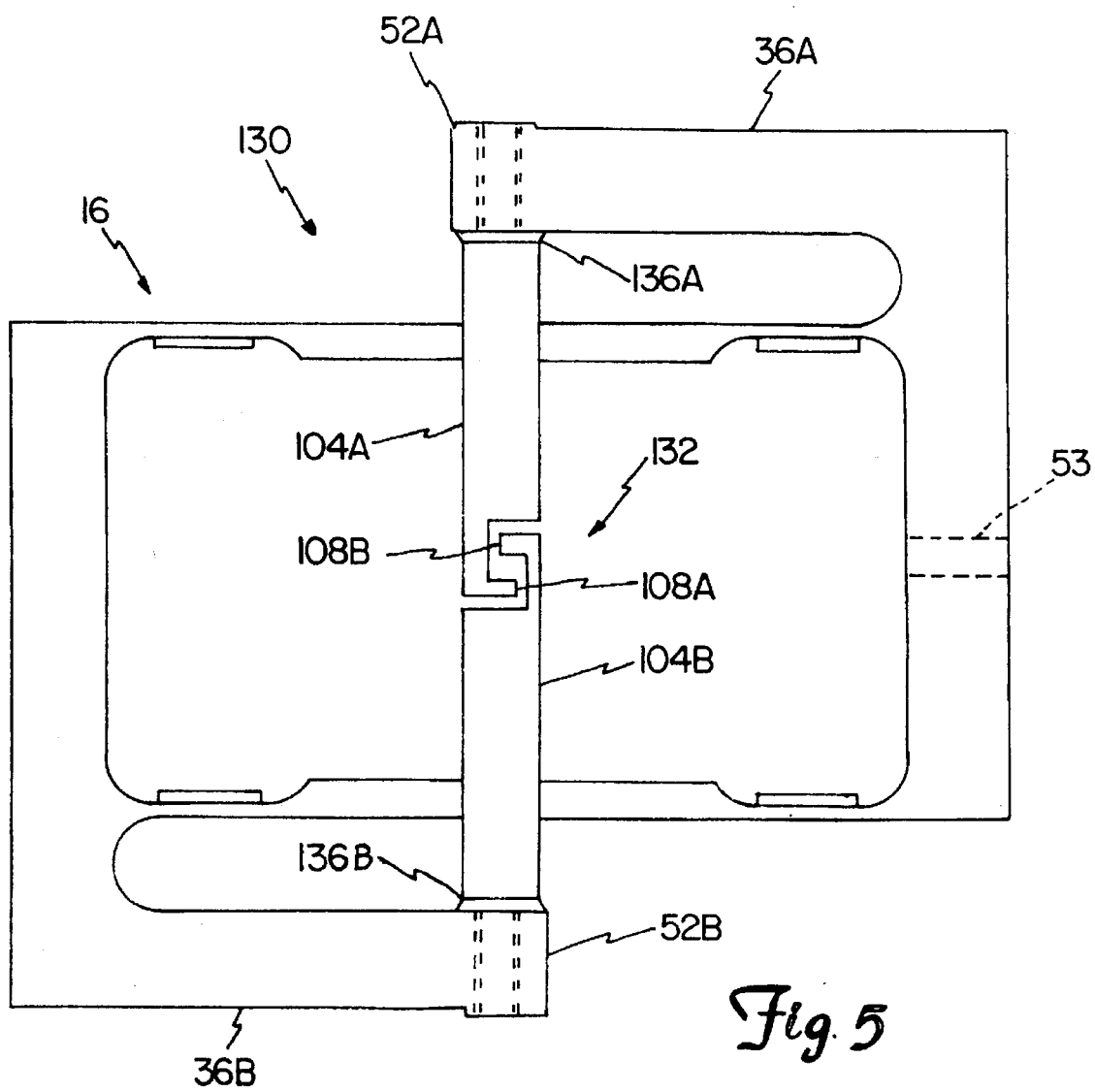
FIG. 5 is a front elevational view of a third embodiment of the present invention.
Figure 6:
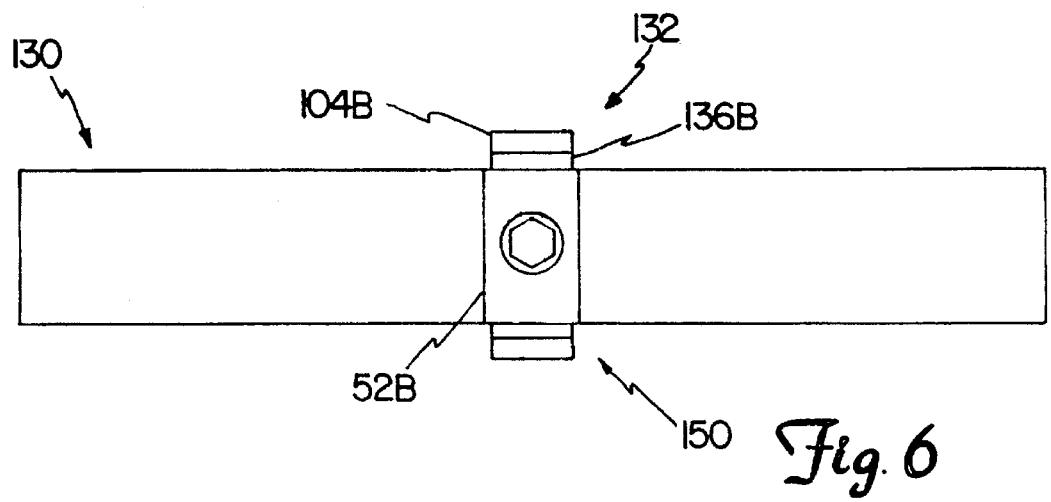
FIG. 6 is a bottom plan view of the embodiment of FIG. 5.
Figure 7:
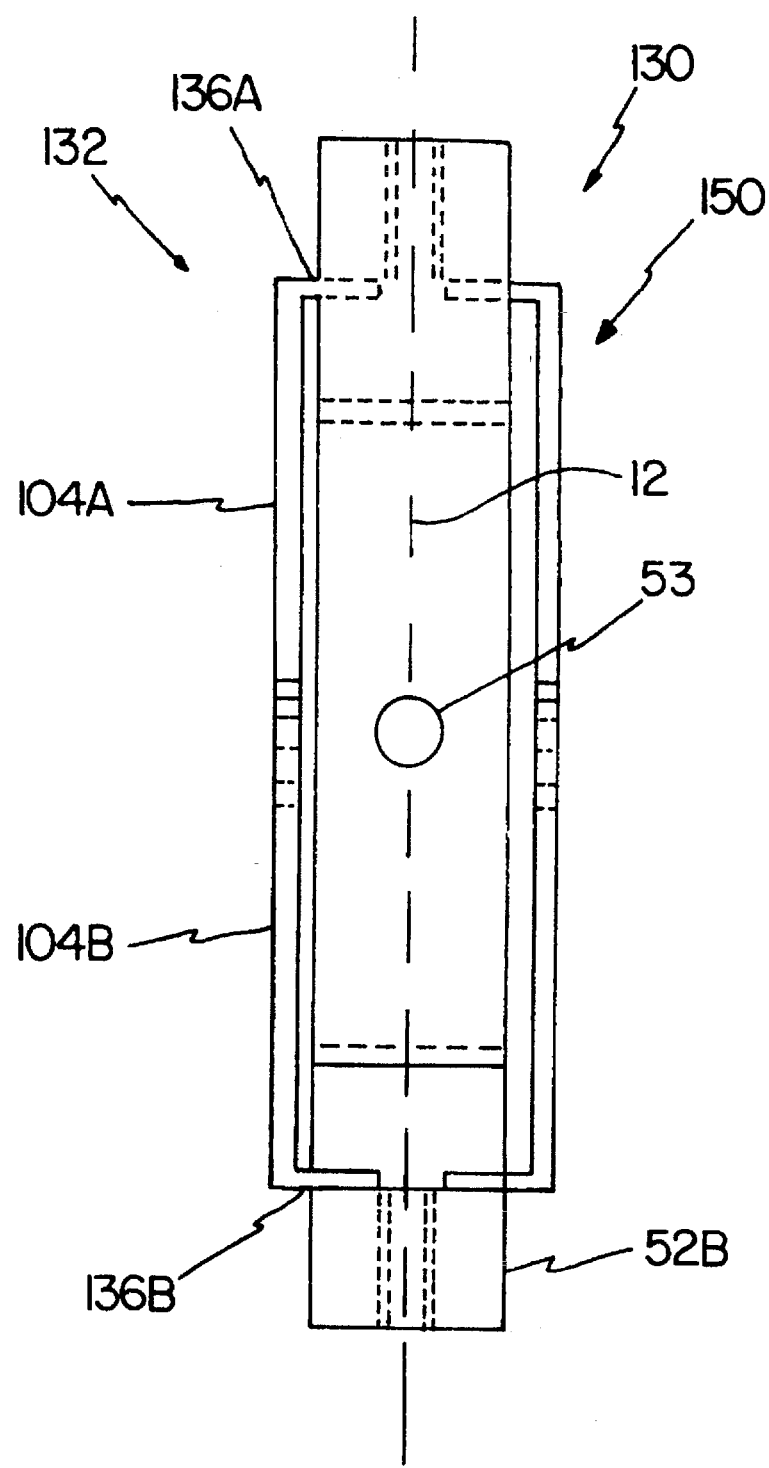
FIG. 7 is a side elevational view of the embodiment of FIG. 5.

Another embodiment of the load cell of the present invention is illustrated generally at 130 in FIGS. 5, 6 and 7. The load cell 130 includes an overload stop assembly 132 similar in construction to the overload stop assembly 102 of the embodiment described above having interlocking stop bars 104A and 104B. However, as illustrated in FIGS. 6 and 7, the overload stop assembly 132 of this embodiment is located on the side of the flexure assembly 16. Specifically, the stop bar 104A is mounted on a plate 136A extending outwardly from the free end 52A of the connection arm 36A. Similarly, the stop bar 104B is mounted on a plate 136B that is joined to the free end 52B of the second connection on 36B. The stop bars 104A and 104B interlock as described above using the flanges 108A and 108B when excessive tension and compressive force loads are present. Preferably, a second overload stop assembly 150 is mounted on a side opposite the first overload stop assembly 132 to balance loading on each side of the test axis 12 and the load cell 130. The second overload stop assembly 150 is identical to the first overload stop assembly 132.

In summary, the present invention provides a load cell well adapted to measure light force loads between two elements. The load cell includes a four bar linkage having an overload stop assembly that rigidly connects the mounting ends of the force transducer together when excessive force loads are present.

Although the present invention has been described with reference to preferred embodiments, workers skilled in the art will recognize that changes may be made in form and detail without departing from the spirit and scope of the invention.

What is claimed is:

1. A load cell assembly for measuring force loads between a first element and a second element along a test axis, the load cell assembly comprising:

a first support portion having a first end and a second end;

a second support portion parallel to the first support portion and having a first end and a second end;

first flexure means for joining the first ends of the first and second support portions, the first flexure means having two spaced apart flexure regions;

second flexure means for joining the second ends of the first and second support portions, the second flexure means having two spaced apart flexure regions;

measuring means for measuring strain in at least one of the flexure regions and providing a representative output signal;

a first connection arm joined to the first end of the second support portion, the first connection arm having a free end with means for connecting the first element thereto, the free end of the first connection arm being positioned between the flexure regions of the first flexure means;

a second connection arm joined to the second end of the first support portion, the second connection arm having a free end with means for connecting the second element thereto, the free end of the second connection arm being positioned between the flexure regions of the second flexure means; and a stop member joined to the end of the second support portion and extending toward the free end of the second connection arm, the stop member selectively contacting the free end of the second connection arm between the flexure regions of the second flexure means.

2. The load cell as specified in claim 1 wherein the second connection arm includes a projection extending outwardly from the free end, the stop member selectively contacting the projection.

3. The load cell as specified in claim 2 wherein the stop member includes an aperture, the projection being displaceable within the aperture.

4. The load cell as specified in claim 3 wherein a length of the first connection arm equals a length of the second connection arm.

5. The load cell as specified in claim 4 wherein the means for connecting the first element is positioned an equal distance from each flexure region of the first flexure means.

6. The load cell as specified in claim 5 wherein the means for connecting the second element is positioned an equal distance from each flexure region of the second flexure means.

7. The load cell as specified in claim 6 wherein the means for connecting the second element is on the test axis, and the means for connecting the first element is on the test axis.

8. The load cell as specified in claim 1 wherein the stop member includes means for limiting displacement of one of the free ends in a plane perpendicular to the test axis.

9. The load cell as specified in claim 8 wherein the means for limiting displacement of one of the free ends in a plane perpendicular to the test axis comprises a guard plate.

10. The load cell as specified in claim 1 wherein the measuring means provides a signal proportional to the measured strain, and the load cell assembly further includes monitor means coupled to the measuring means for receiving the signal and displaying a value proportional to the signal.

11. A load cell assembly for measuring force loads between a first element and a second element along a test axis, the load cell assembly comprising:

a first support portion having a first end and a second end;

a second support portion parallel to the first support portion and having a first end and a second end;

first flexure means for joining the first ends of the first and second support portions, the first flexure means having two spaced apart flexure regions;

second flexure means for joining the second ends of the first and second support portions, the second flexure means having two spaced apart flexure regions;

measuring means for measuring strain in at least one of the flexure regions and providing a representative output signal;

a first connection arm joined to the first end of the second support portion, the first connection arm having a free end with means for connecting the first element thereto, the free end of the first connection arm being positioned between the flexure regions of the first flexure means;

a second connection arm joined to the second end of the first support portion, the second connection arm having a free end with means for connecting the second element thereto, the free end of the second connection arm being positioned between the flexure regions of the second flexure means;

a first stop portion connected to the first connection arm and extending toward the second connection arm parallel to the test axis;

a second stop portion connected to the second connection arm and extending toward the first connection arm parallel to the test axis, wherein the second stop portion and the first stop portion selectively contact each other to limit displacement of the free ends.

12. A load cell assembly for measuring force loads between a first element and a second element along a test axis, the load cell assembly comprising:

a first support portion having a first end and a second end;

a second support portion parallel to the first support portion and having a first end and a second end;

first flexure means for joining the first ends of the first and second support portions, the first flexure means having two spaced apart flexure regions;

second flexure means for joining the second ends of the first and second support portions, the second flexure means having two spaced apart flexure regions;

measuring means for measuring strain in at least one of the flexure regions and providing a representative output signal;

a first connection arm joined to the first end of the second support portion, the first connection arm having a free end with means for connecting the first element thereto, the free end of the first connection arm being positioned between the flexure regions of the first flexure means;

a second connection arm joined to the second end of the first support portion, the second connection arm having a free end with means for connecting the second element thereto, the free end of the second connection arm being positioned between the flexure regions of the second flexure means;

a first stop portion connected to the free end of the first connection arm and extending on the test axis toward the second connection arm;

a second stop portion connected to the free end of the second connection arm and extending on the test axis toward the first connection arm, wherein the second stop portion and the first stop portion selectively contact each other to limit displacement of the free ends.

13. The load cell of claim 12 wherein the first stop portion extends through an aperture in the first flexure means, and wherein the second stop portion extends through an aperture in the second flexure means.

* * * * *